B. T. BABBITT.
Wind-Motor.
No. 219,894.                    Patented Sept. 23, 1879.
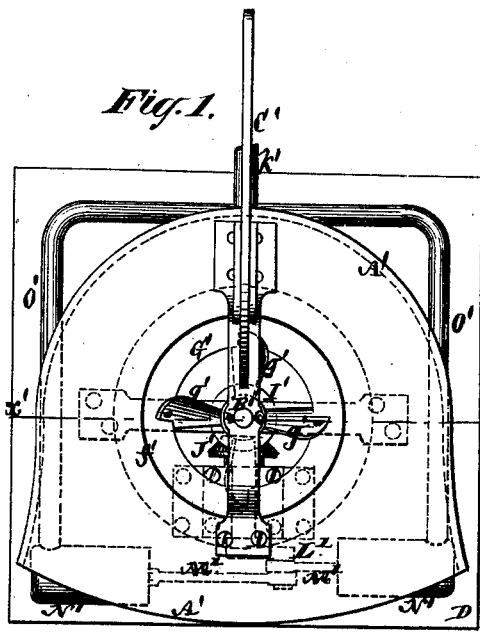
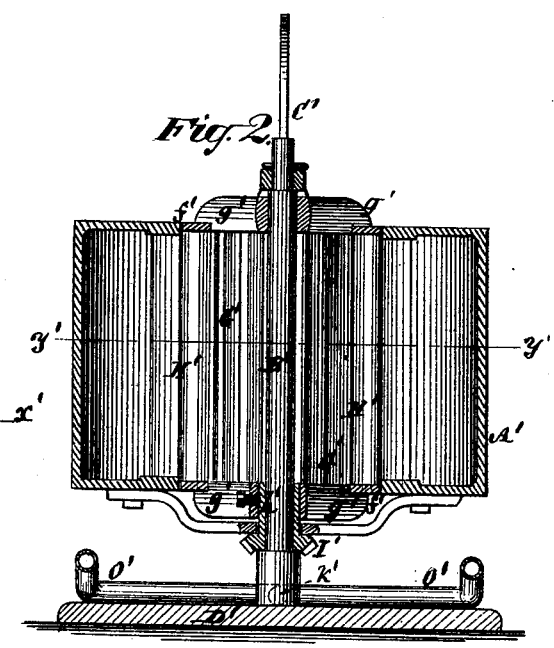
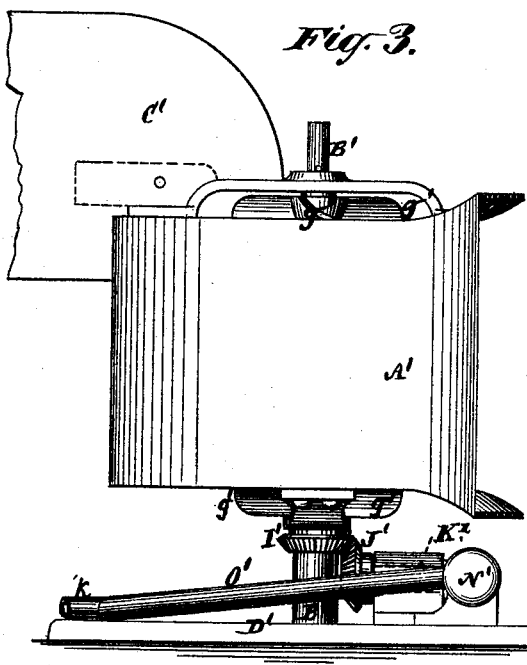
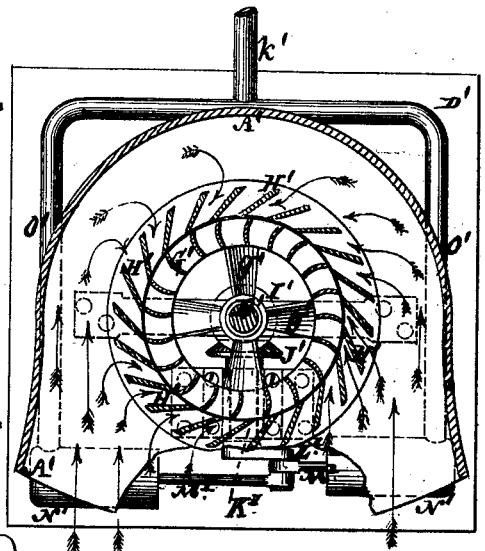
Witnesses
John Becker
Fred K Haynes
Inventor
B. T. Babbitt
by his Attorneys
Brown & Brown

UNITED STATES PATENT OFFICE.

BENJAMIN T. BABBITT, OF NEW YORK, N. Y.

IMPROVEMENT IN WIND-MOTORS.

Specification forming part of Letters Patent No. 219,894, dated September 23, 1879; application filed March 12, 1879.

*To all whom it may concern:*

Be it known that I, BENJAMIN T. BABBITT, of the city and State of New York, have invented certain Improvements in Wind-Motors for Compressing Air and for other purposes, of which the following is a full, clear, and exact description, reference being had to the accompanying drawings, forming part of this specification.

This invention more particularly relates to apparatus for storing power by compressing air through the agency of the wind.

The invention consists in a combination of a rotating cowl capable of self-adjustment to the wind; an upright wind or bucket wheel arranged to rotate about or around the same axis or center of motion as the cowl; a series of upright deflectors attached to the cowl and inclosing said wheel to direct the wind onto the buckets of the latter; a stationary upright shaft common to both the cowl and the bucket-wheel, thus dispensing with separate shafts; and mechanism applied to said wheel for communicating motion from the latter.

The invention also consists in a combination of a rotating cowl capable of self-adjustment to the wind; an upright wind or bucket wheel arranged to rotate about or around the same axis as the cowl; a stationary shaft, around which both the bucket-wheel and the cowl are free to rotate; a rotating shaft arranged at right angles to the stationary shaft, and receiving its motion from the bucket-wheel; air-compressing pumps having a fixed relation to the cowl, also provided with a common discharge-pipe; and a crank on said rotating shaft for operating said pumps, essentially as hereinafter described.

In the accompanying drawings, Figure 1 represents a plan view of an apparatus constructed in accordance with the invention. Fig. 2 is a vertical section of the same on the line $x'\ x'$. Fig. 3 is a side elevation thereof, and Fig. 4 a horizontal section on the line $y'\ y'$ in Fig. 2.

A' is a rotating cowl, provided with a vane, C', to make it self-adjusting to the wind upon and around a stationary upright shaft, B', which is erected on a base, D'. Said cowl has a wide or flaring mouth, but is of curved or partly-cylindrical form at its back. Arranged to freely rotate within the cowl A' around the upright shaft B' as a center of motion is a vertical wind or bucket wheel, G', surrounded by a circular series of vertically-arranged deflectors, H', for directing the wind or air, as it is received and collected within the cowl, onto or against the buckets of the wheel G', all around the latter, said deflectors being attached to the cowl and stationary in relation with the bucket-wheel.

Apertures $f'$ in the top and bottom of the cowl form exhaust-outlets for the wind after it has performed its duty on the buckets of the wheel and on beveled or oblique arms or vanes $g'$, attached to the upper and lower ends of the wheel and arranged to rotate within the exhaust-outlets $f'$, to more fully utilize the force of the wind.

This construction of wind-motor, irrespective of the arrangement of its parts, is not here separately claimed as new, the same being the subject of a separate application by me for Letters Patent filed simultaneously with this.

Attached by a sleeve, $h'$, and a set-screw or other means to the hub of the wheel G', preferably at the lower end of the latter, is a bevel-wheel, I', arranged to rotate around the stationary shaft B' as the bucket-wheel is set in motion by the action of the wind. This wheel I' gears with a bevel-wheel, J', fast on a horizontal shaft, K', which is free to rotate in one or more fixed bearings, and which has secured to it a crank, L', that by means of rods M' M' serves to give a reciprocating motion simultaneously in opposite directions to the pistons or plungers of two air-compressing pumps, N' N'. These pumps have a fixed relation to the cowl—that is, do not turn with it, but are stationary—and may be firmly secured on the base D', where they will be readily accessible for repairs. Said pumps are here supposed to be single-acting, and are connected with a bent discharge-pipe, O', common to both, and having a general outlet-branch, $k'$, which conducts the compressed air furnished by the pumps to a reservoir to be utilized as required, a steady supply of compressed air being kept up by means of the alternate compressing action of the pumps.

I claim—

1. The combination of a rotating cowl capable of self-adjustment to the wind, an upright wind or bucket wheel arranged to rotate about or around the same axis or center of motion as the cowl, a series of upright deflectors attached to the cowl and inclosing said wheel, a stationary upright shaft common to both the cowl and the bucket-wheel, and mechanism applied to said wheel for communicating motion from the latter, substantially as specified.

2. The combination of the rotating cowl A′, the upright wind or bucket wheel G′, the stationary shaft B′, the shaft K′, deriving its motion from the bucket-wheel, the crank L′, the air-compressing pumps N′ N′, having a fixed relation with the cowl, and the discharge-pipe O′, essentially as herein described.

B. T. BABBITT.

Witnesses:
T. J. KEANE,
FREDK. HAYNES.